United States Patent [19]

Singer et al.

[11] 4,198,438

[45] Apr. 15, 1980

[54] MODIFIED GLUTEN PRODUCT AND PROCESS

[75] Inventors: Norman S. Singer; David W. Murray, both of London, Canada

[73] Assignee: John Labatt Limited, London, Canada

[21] Appl. No.: 828,197

[22] Filed: Aug. 26, 1977

[30] Foreign Application Priority Data

Aug. 27, 1976 [GB] United Kingdom ............... 35670/76

[51] Int. Cl.² ............................ A21D 2/36; A23J 3/00
[52] U.S. Cl. ..................... 426/549; 426/656; 426/653; 426/23; 260/112 G
[58] Field of Search ................... 426/19, 23, 549, 557, 426/573, 656, 658, 653; 260/112 G

[56] References Cited

U.S. PATENT DOCUMENTS

| | | | |
|---|---|---|---|
| 1,657,116 | 1/1928 | Fiske | 426/549 |
| 3,219,455 | 11/1965 | Dubois | 426/549 |
| 3,234,027 | 2/1966 | Jertson et al. | 426/19 |
| 3,851,072 | 11/1974 | Huessy | 426/656 X |
| 3,992,554 | 11/1976 | Blake et al. | 426/557 |
| 4,076,845 | 2/1978 | Johannson | 426/656 X |

OTHER PUBLICATIONS

Christianson, *Bakers Digest*, vol. 50, No. 3, Jun. 1976, pp. 34-36.
Glabe et al., *Cereal Science Today*, vol. 2, No. 6, Jul. 1957, p. 159-162.
Pyler, *Baking Science and Technology*, vol. 1, Chicago, Siebel Publishing Co., (1973), pp. 261, 262.
Matz, *Bakery Technology and Engineering*, Second Edition, The AVI Publishing Co., Inc., Westport, Conn., (1972), pp. 157, 161.

*Primary Examiner*—Raymond N. Jones
*Assistant Examiner*—Esther M. Kepplinger
*Attorney, Agent, or Firm*—Fisher, Christen & Sabol

[57] ABSTRACT

The present invention provides a modified gluten product useful in baking applications. The product comprises the reaction product of vital gluten and xanthan gum. The invention also provides a process for the production of the product on baking processes utilizing same.

11 Claims, 14 Drawing Figures

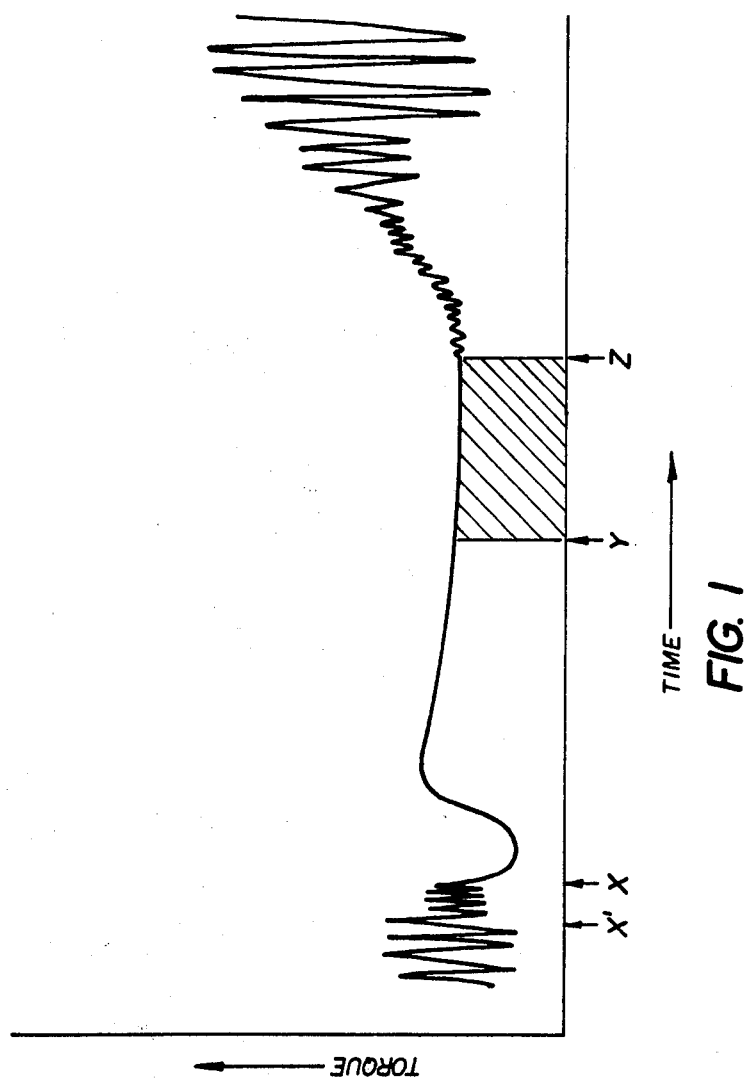

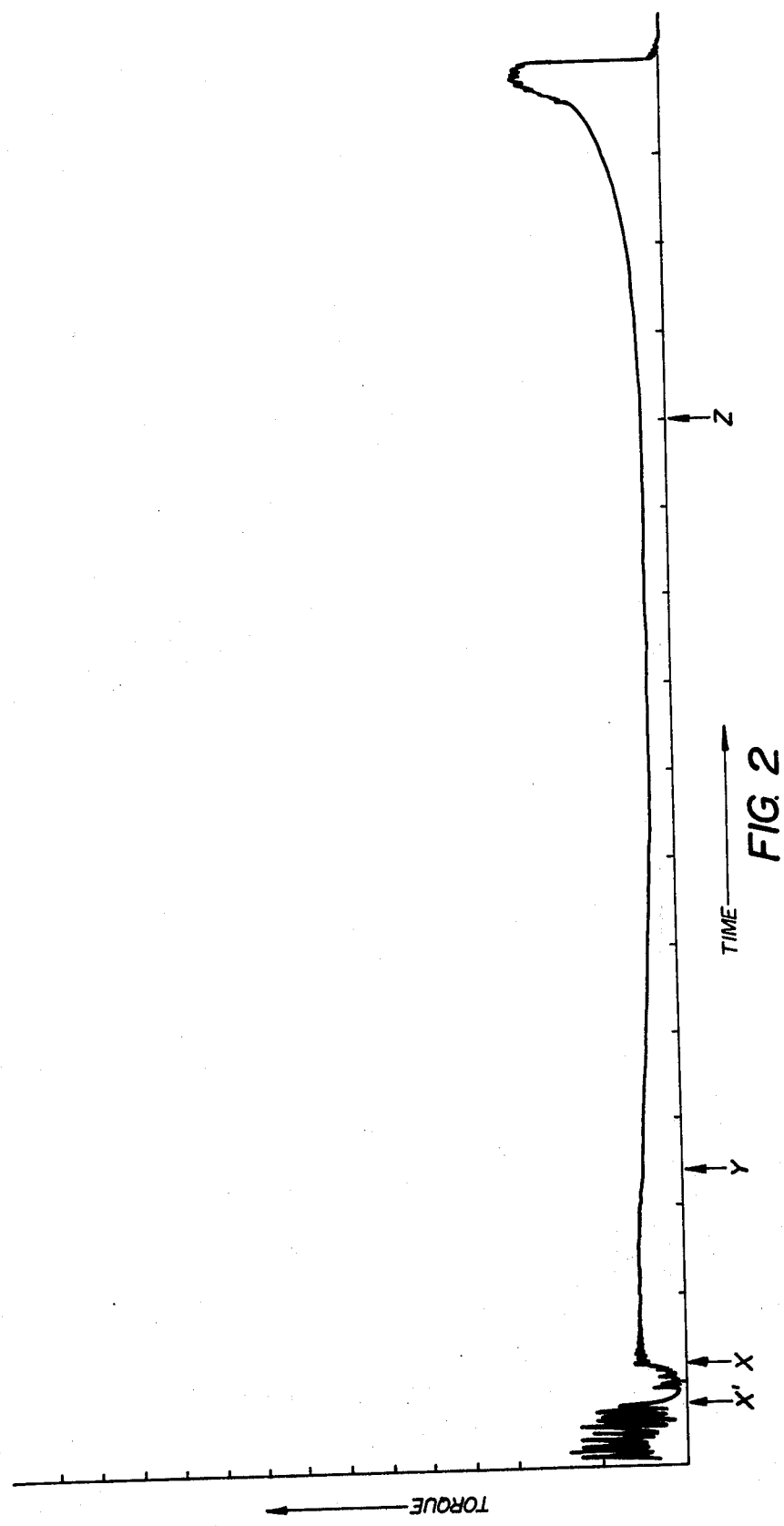

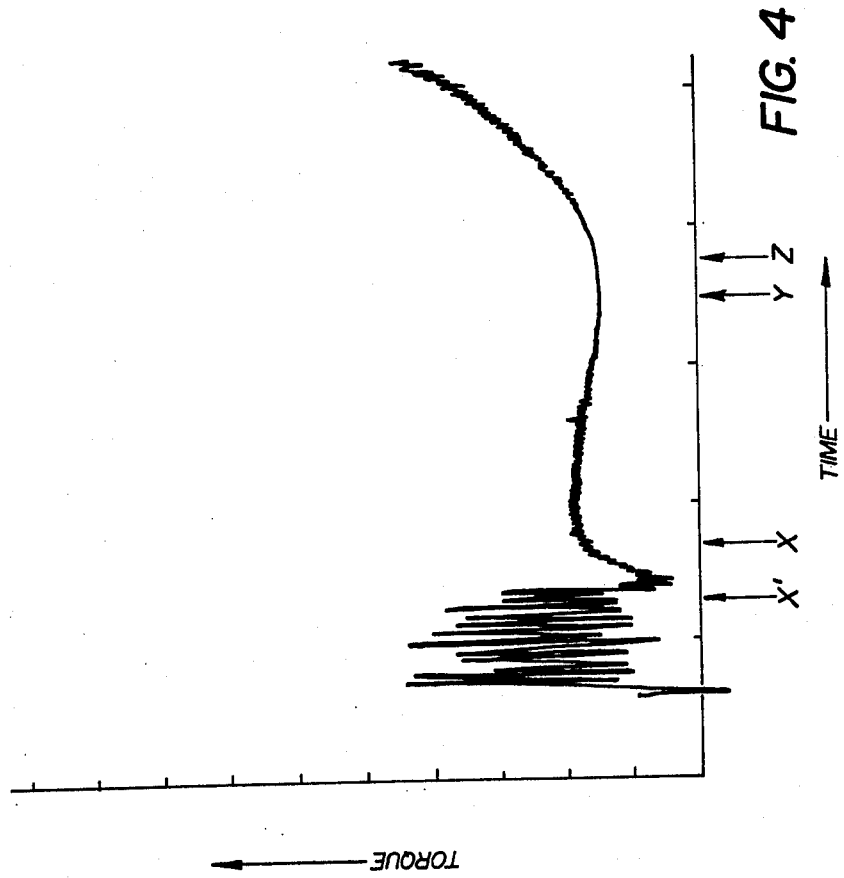

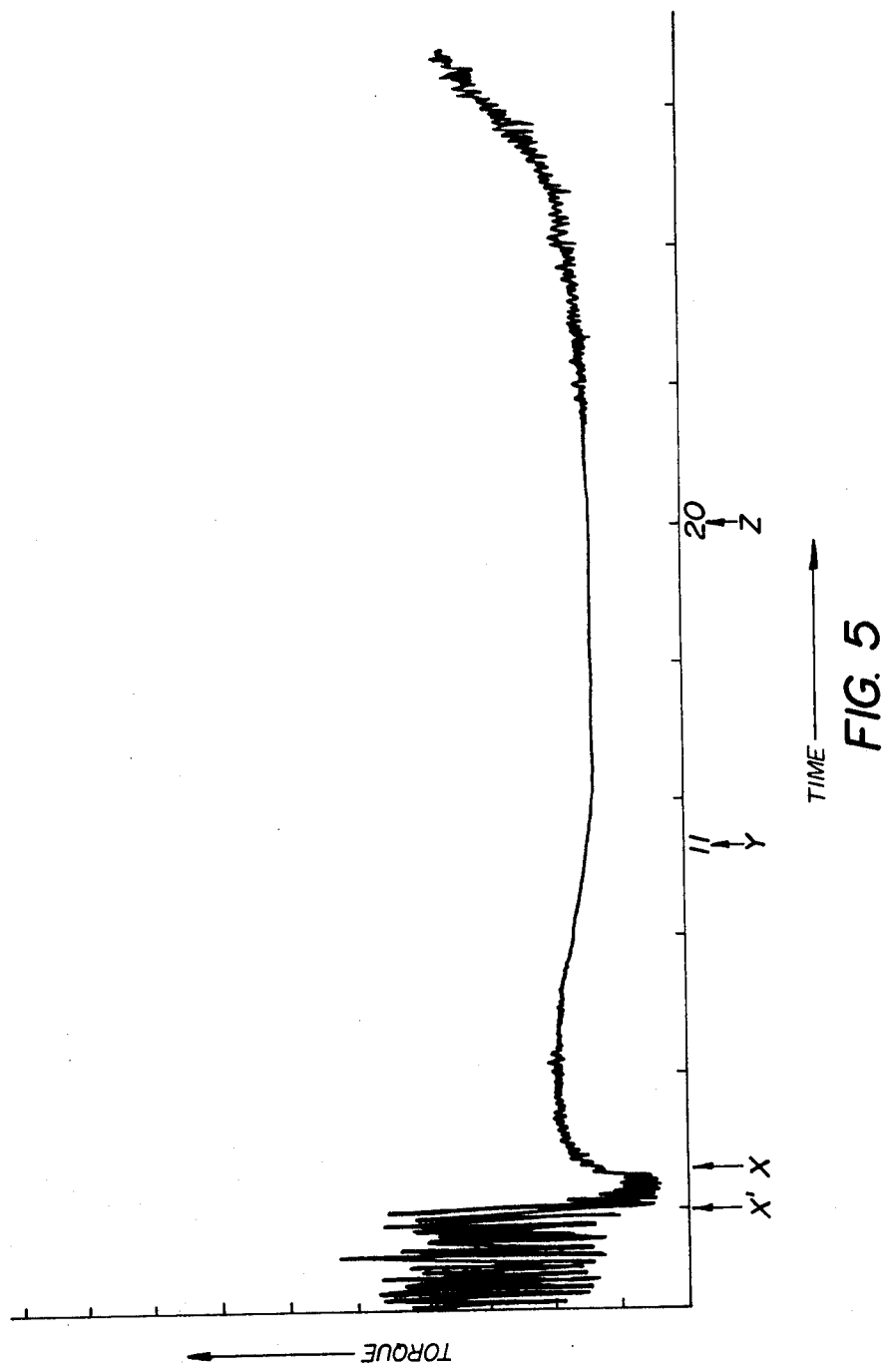

MODIFIED GLUTEN PRODUCT AND PROCESS

The present invention relates to a modified gluten product and, the use thereof in food products especially leavened flour products.

BACKGROUND OF THE INVENTION

Wheat flour, which forms the basis for leavened baked products such as conventional breads, comprises mainly starch and gluten. The gluten component is acknowledged as being the major factor in the retention of gas developed within the dough, adequate gas production and retention being critical to the production of an acceptable product. The gluten functions by undergoing hydration and subsequently forming a network or matrix which encompasses the other components especially the starch component. In order to fulfill this role the gluten must be vital, i.e., not denatured and in many ways wheat gluten is exceptional in that this property is not possessed by many other vegetable proteins, for example, soybean protein. In addition to the above role, gluten also constitutes a valuable source of protein. Gluten and other proteins, such as soybean protein referred to above, are also added to flour doughs to supplement the indigenous or native protein content of the flour. However, supplemental vital gluten is able to fulfill the dual roles referred to above, whereas other supplemental proteins merely increase the protein content in the product. The ability of the supplemental gluten to enter into the protein matrix created by the indigenous gluten is extremely desirable leading as it does to a product having an improved structure, crumb, volume and firmness. It will be appreciated therefore, that maintaining and, if possible, increasing the vitality of the gluten is extremely important because of the resulting advantages which are obtained.

Gluten is also used in the production of many food products where its unique ability to modify the structure and texture of various food materials may be exploited. Examples of such products are simulated meat products (for consumption both by humans and pets), breakfast cereals, textured vegetable protein and simulated cheese products. However, some difficulties are encountered when dispersing gluten throughout many food systems and these restrict its more widespread use in such applications. Dispersibility of gluten depends in part on its moisture-imbibing and maleability characteristics and improvement thereof would therefore be highly desirable.

Many methods are known to preserve and/or improve the vitality, maleability, etc., of normal vital gluten: one such method is described in U.S. Pat. No. 3,704,131. However, the prior art methods leave something to be desired.

Gums such as carrageenan, locust bean gum and arabic gum have been used in many food products, for example, in bread as anti-staling agents. (Refer to the Handbook of Food Additives, 2nd Edition, page 325, at page 348.) However, attempts to use xanthan gum in conventional doughs were found to be unsuccessful, the resulting products being inferior to those produced from conventional doughs. Also, use of a mixture of xanthan gum and gluten in combination with starch had the same effect, namely the resulting baked products were inferior to those products using either component alone. (Refer to the article entitled "Engineered Foods of the Future: Baked Goods Fortified with Vegetable Protein" by D. D. Christainson [Northern Regional Research Laboratory, U.S. Dept. of Agr., Peoria, Illinois] dated Mar. 23, 1976.)

Additionally, there have been many attempts to produce a bread-like product which does not require or rely on gluten. This would make "bread" available to persons who are not able to digest gluten-containing products, and would also enable bread-like products to be manufactured in locations where a ready supply of wheat flour itself, or the necessary vital gluten, is not available. Much effort has been expended in recent times to utilize the microbially-produced gums to fulfill the role of gluten in bread-like products. As reference to the article by Christainson shows the research has to some extent been successful. It was found that a combination of xanthan gum and starch per se could be formed into a dough which gives a product very similar to bread produced using conventional doughs. Since the presence of free or gelatinized starch is apparently essential it is believed that the xanthan gum reacts with the starch and thereby forms a matrix similar to that previously obtainable only with gluten. Moreover, it is possible to load the matrix so-formed with up to about 22 percent protein for example, in the form of soy isolate. However, as mentioned above and reported at page 4 of the Christainson article referred to previously, it was considered that xanthan gum had only deleterious effects when added to conventional flour doughs containing indigenous (gluten) protein.

SUMMARY OF THE PRESENT INVENTION

It is an object of the present invention to provide a modified gluten product which when hydrated has improved maleability and moisture imbibing characteristics.

A further object of the present invention is to provide improvements in methods of making leavened bakery products using the novel product of this invention.

It has now been found and this finding forms the basis of the present invention that xanthan gum, under selected conditions, will interact with normal vital wheat gluten and the properties of the modified vital gluten are thereby very favorably enhanced. This finding must be considered highly surprising in view of the findings reported above concerning the deleterious effects of xanthan gum/gluten mixtures in baking applications.

As to the actual composition of the product of the present invention, this is not known for certain. However, there are indications that the gluten is modified by at least a significant proportion of its free gliadin content being complexed with the xanthan gum and it is believed that the presence of the gliadin/xanthan gum complex imparts the desired properties to the novel product. For example, when xanthan gum in aqueous solution is added to an aqueous solution of isolated gliadin, a complex precipitates. The gliadin:xanthan gum ratio in the precipitate (at a set pH) can be increased until a maximum is reached (refer to FIG. 7) indicating that all available free gliadin has then been complexed; hence, no advantage would be gained by exceeding that limit. Moreover, it has also been found that it is not necessary to complex all the free gliadin; a satisfactory product being produced if a significant proportion, at least 40 percent, of the free gliadin in the gluten is in complexed form. Also, the gliadin:xanthan gum ratio is dependent on the pH and the accompanying FIG. 8 details a plot (solid line) of xanthan gum/protein ratio in the precipitated complex against the pH of the medium in which the complex was formed. Also plotted on the graph is the corresponding theoretical curve calculated from the mean net charges and molecular weight of xanthan and gliadin. It can be seen that the two curves are quite similar, thereby supporting the complex theory postulated above. (Experimental details relating to the graphs of FIG. 7 and FIG. 8 are given hereinafter.)

The modified gluten product of the present invention is prepared by mixing vital gluten with xanthan gum under conditions selected to ensure that the protein/gum complex is formed. For example, the gluten may be dispersed in aqueous solution and the xanthan gum, either dry or in, preferably aqueous, solution, added thereto and the mixture stirred until complexing occurs. Obviously, the gluten tends to ball up but, surprisingly, the xanthan gum is able to react under those conditions. The reaction mixture is generally dried by normal procedures to obtain the desired product as a dry powder.

However, the product formed by reacting xanthan gum with previously undried wet vital gluten direct from the dough washing process (containing about 30 to 40 percent solids) has been found more effective as a baking additive giving better loaf volumes, etc., and for that reason is the presently preferred method. This modified gluten product may be formed by extensively mixing wet normal vital gluten with xanthan gum, preferably in the presence of a buffering and/or metal ion sequestering agent for a predetermined period of time. The amount of mixing is extremely important since below a predetermined minimum, it is believed the desired complex is not formed, and the resulting baked products are poor in volume; and above a predetermined maximum, although adequate product volumes may be obtained, the cell-structure is very coarse and unacceptable, possibly because of adverse effects on the earlier formed complex.

DETAILED DESCRIPTION OF INVENTION

Figure 3B:
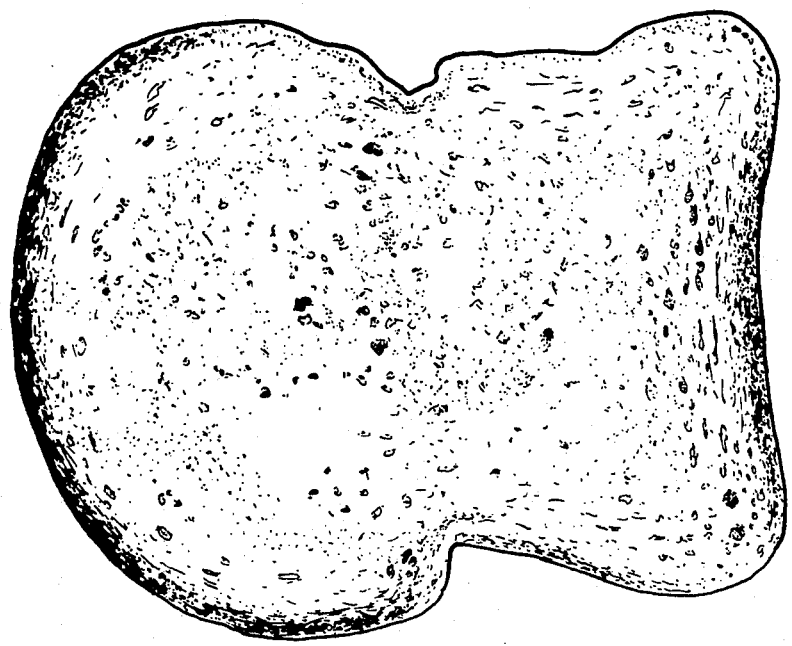

According to a product aspect of the present invention, there is provided a modified gluten product comprising vital gluten reacted with xanthan gum. As explained herein, it is believed that the novel product of the present invention comprises vital gluten wherein a significant proportion of the free gliadin content thereof has been reacted with xanthan gum resulting in the formation of a complex.

According to a preferred embodiment of the process of the present invention, it has been found that when xanthan gum, usually in a dry state, and optionally an agent which has a sequestering and/or buffering action, are extensively mixed with wet gluten, the gluten mass immediately disaggregates forming relatively large lumps of gluten contained in a slippery xanthan matrix. These lumps continuously reduce in size as mixing continues resulting in the production of the desired product comprising a substantially uniform mass which is softer and more maleable than the vital gluten per se. If this product is subjected to further mixing, the uniform mass is eventually converted into a pale rubbery inextensible mass having an apparent viscosity some 3 to 5 times higher (and correspondingly lower extensibility) than the desired product.

The mixture of xanthan gum/gluten therefore, appears to undergo several phase changes during the mixing—refer to the accompanying FIG. 1 which shows diagrammatically the phase changes via changes in torque to which the blade of the mixer (a Brabender sigma-blade mixer) was exposed during the course of the mixing period.

It may be noticed that the mixing action of the Brabender when used to produce the modified gluten of the present invention is significantly more extensive, involving much higher shear, than is generally encountered during normal baking operations. In normal baking trials, the Brabender mixer (model 600) operates at about 60 rpm whereas the curve in FIG. 1 was obtained when mixing at 250 rpm—a five-fold increase. Moreover, the time required to produce the desired product can be dramatically reduced if even more intensive mixing is effected (as shown hereinafter).

Referring to FIG. 1, a sequestering agent (such as sodium citrate) and dry xanthan gum are added to wet vital gluten at time X' and X respectively. The gluten mass immediately breaks down into lumps (usually up to about 1" in diameter) which gradually decrease in size until at point Y a fairly uniform highly maleable extensible mass is obtained. This mass is usually softer than the original wet gluten mass. Continued mixing soon produces a softer more uniform maleable mass which is not further altered until point Z when conversion to a pale rubbery inextensible mass commences. The reduction in band width to a minimum (the thickness of the recording pen nib) throughout the plateau region illustrates dramatically the increased maleability of the desired product.

The material obtained by arresting the mixing within the period Y-Z is the desired product which may be used in the wet state, or it may be frozen or dried for later use. (In the latter case, the usual precautions to prevent denaturing of the protein will, of course, be required.)

It will be appreciated that although the mixing action used in the above described evaluation is greatly intensified compared with normal bakery mixing actions, that mixing is at the lower end of the range contemplated by this preferred embodiment of the process of the present invention. As a consequence, because of the length of time required to complete the mixing, the various stages in the production of the desired product are represented by well defined and easily discerned regions of the curve of FIG. 1. As the intensity of the mixing is increased, the time required to complete the mixing will decrease and the various regions in the resulting curve are not as well defined. (This effect is illustrated later in Example 4.)

Products obtained by arresting mixing prior to point Y are found to give baked goods which are poor in volume whilst those obtained by arresting mixing subsequent to point Z produce baked goods having a very coarse cell structure although they may have normal volumes. In either instance, the gluten product does not produce an acceptable baked product.

The wet gluten used is preferably the product obtained from dough washing separation process prior to its being dried, the material having a solids content of from about 30 to 40 percent by weight. It will be appreciated that using such material allows a drying stage to be omitted in the overall process and, moreover, the modified product thereby obtained appears to give better results, such as increased loaf volumes, when used in baking applications.

Normal vital gluten is a concentrated natural protein generally containing 50 to 80 percent protein, 6 to 8 percent fat-like phospholipids and related compounds, some fiber, residual starch, a small amount of mineral matter and some water. It is generally obtained commercially by one of several working processes in which wheat flour is kneaded with water to remove the starch and water-soluble materials (termed "wheat solubles") from the gluten. (Further details may be found in the aforementioned U.S. Pat. No. 3,704,131.) For present purposes it is sufficient to note that the vital gluten so obtained may vary somewhat in composition depending on the process used to obtain it and even from batch to batch when using the same process because of variances in the flour used, etc. In particular, the amount of wheat solubles remaining in the vital gluten may vary and this has been found to have a significant effect when the vital gluten is used to produce the novel product of the present invention.

In general, it has been found that the amount of wheat solubles present in the vital gluten starting material is directly proportional to:

(i) the amount of mixing required to produce the desired product, in other words, the time period between X' and Y in FIG. 1; and (ii) the period within which the maleable state persists i.e. before conversion to the undesirable rubbery material commences; the time period between Y and Z in FIG. 1.

The above statements refer, of course, to the process embodiment using wet gluten (effectively involving mixing of a xanthan gum/wet gluten dough).

Although the xanthan gum is not obtained in the same manner, it is also a natural product and minor variances between batches are therefore inevitable.

As previously stated, the amount and type of mixing of the various components is crucial if the resulting product is to have the desired advantages since interaction between the gluten and xanthan gum must be ensured. It will be appreciated from the above that the minimum and maximum mixing times at a set shear for a specific sample of vital gluten and/or xanthan gum used as starting material may vary depending on many factors, and therefore, it is not really possible to delineate the minimum or maximum amount of mixing which is required to produce the novel product of the present invention. However, the data necessary to enable a specific sample of vital gluten to be converted into the desired product is easily and rapidly obtained by carrying out the simple Brabender mixer experiment which is described generally above and in detail in the following specific examples; the horizontal portion of the curve (within Y–Z) denoting that the power requirements to effect mixing is constant, i.e., the buckiness has disappeared and the desired maleable product formed. It is preferred that the xanthan gum be added to the wet gluten immediately, i.e., after a short initial period wherein a steady even mixing action has been achieved. Although strict adherence to this requirement is not considered essential, excess working of the mixture prior to the addition of the xanthan gum is to be avoided since present evidence indicates that such prolonged working prior to the xanthan gum addition, causes the mixture to reach the undesirable final rubber state without ever passing through the intermediate "maleable" state. Since the desired product is only obtained during the "maleable" state, in the absence thereof none of the desired product will be formed. Although the amount of water present during the mixing is not critical, a minimum amount must be present otherwise conversion from the "lumpy" phase to the maleable soft phase may not occur.

The ratio of xanthan gum to gluten is also not critical within fairly wide limits, for example, 1:200 to 1:4, preferably 1:60 to 1:20. A xanthan gum:gluten ratio of about 1:40 has been found fully satisfactory.

Although the xanthan gum is generally added to the wet gluten in dry form, it is also possible to use solutions thereof in water, a 2 to 5 percent by weight solution being suitable; or as a suspension or slurry, comprising, for example, from 20 to 60 percent of gum, in a suitable oil.

The pH of the reaction mixture during mixing is important since the charges on the protein and gum reactants change with pH and consequently so does the tendency of the reactants to form the desired product. It has been found that a pH up to about 8 is satisfactory, within the range 5 to 8 preferred and within the restricted range of 6.5 to 7.5 most preferred since, in that range, the desired product is readily prepared with maximum utilization of the relatively expensive xanthan gum reactant.

The amount of sequestering agent and/or buffering present in the novel product may vary within wide limits, for example, from 0.25–4 percent of sodium citrate, or an equivalent amount of another agent, being sufficient.

The natural materials required to produce the novel product of the present invention are readily available. Xanthan gum is a high molecular weight linear polysaccharide of microbiological origin containing D-glucose, D-mannose and D-gluconic acid. It is generally available as a dry cream-colored powder from Kelco Company of Clark, N.J. under the trade mark KELTROL. (More details of KELTROL may be found in the Technical Bulletin DB18 available from Kelco Company.)

Various buffering and/or metal ion sequestering agents may be utilized to form the novel product of the present invention, the only restriction being that they must, of course, be non-toxic when the product is used in the production of foodstuffs as is generally the case. Examples of suitable materials include citrates, such as alkali metal citrates, for example, sodium citrate and potassium citrate; and ammonium citrate; ethylenediaminetetraacetic acid, preferably in the form of the disodium salt; phytates, such as sodium and calcium phytate; simple phosphates such as ammonium phosphate; alkali metal, e.g., sodium and potassium phosphates and akaline earth, for example, magnesium and calcium phosphates; complex phosphates or molecularly dehydrated phosphates such as salts of pyrophosphoric acid, e.g., disodium pyrophosphate; polyphosphoric acid, e.g., sodium tripolyphosphate, and metaphosphoric acid, e.g., sodium hexametaphosphate.

The modified gluten product of the present invention as obtained is a softer product than regular wet gluten and upon drying, yields a dry powder of smaller average particle size than regular gluten. Upon rehydrating, the novel product shows a higher moisture-bonding capacity or ability than regular gluten. The novel product may be used to advantage in bread, biscuit, wafer or pasta doughs. When used in bread doughs, the resulting doughs are softer (less "bucky"), the resulting loaf volumes are greater and the crumb is softer compared to doughs enriched with regular gluten.

Moreover, the novel product disperses readily in brews (as used in continuous and speciality bread manufacture) and has no tendency to agglomerate even over an extended period of time.

The present invention will be further described with reference to, but not limited by, the following specific examples.

EXAMPLE I

Part A

Vital gluten was prepared by the "batter-process" from hard Manitoba spring wheat, 1st clears flour. It was "washed" to the extent that the "solids" contained about 80% protein. The total solids content was determined to be 33.3%; the ash content was found to be 0.26%. Sodium citrate (a metal ion sequestering agent) and dry xanthan gum (KELTROL) were added to the wet gluten mass, the mixture having the following composition:

| Component | % (by weight) |
|---|---|
| Wet gluten | 96.4 |
| Sodium Citrate | 0.4 |
| Xanthan gum | 2.4 |
| Water | 0.8 |
| | 100. |

The components were extensively mixed in a Brabender 600, sigma-blade mixing bowl at 250 rpm. The course of the interaction may be followed by referring to FIG. 2 which is a graph showing the variations in torque during the mixing process. Upon addition of the dry xanthan gum, the wet gluten mass, already mixed with the sodium citrate, disintegrated into relatively large lumps—point X in FIG. 2. Mixing was continued for 11 minutes during which time, the gluten lumps decrease in size until, at the expiry of that period, they had been converted into a relatively uniform highly maleable extensible mass (the band width had decreased from about 16 mm to about 0.5 mm—the width of the trace itself—the band width being inversely proportional to the apparent maleability). The mass was also somewhat softer than before the addition of the xanthan gum (the torque, which is proportional to the apparent viscosity, had decreased from about 0.3 mkg to 0.2 mkg).

Continued mixing resulted in the mass becoming softer and more uniform until, after the lapse of the short period of only two minutes, the mass attained a soft "maleable" state or condition which persisted essentially unchanged for 30 minutes. All uniform products obtained upon arresting such mixing during that period had the desired properties and constitute novel products of the present invention. The products may be utilized immediately in the wet condition or may be stored in a frozen or dried condition. Any conventional drying method may be used provided the conditions utilized prevent overheating and denaturing of the protein in the product. Continued mixing beyond the 30 minute mark produced the undesirable pale rubbery inextensible mass referred to previously.

Part B

The product of Part A was found to be easily reconstituted by simple, and brief, stirring with water thereby producing a soft extensible mass as obtained originally. Moreover, the full amount of water extracted during drying was taken up again by the product.

Regular dry vital gluten when rehydrated in the same manner, reverted to the normal firm rubbery mass typical of gluten but about 3–5% of the water extracted during drying was not taken up by the gluten mass.

Part C

The improved dispersibility characteristics of the modified gluten of the present invention were illustrated by stirring a sample of the product with a simple simulated brew medium comprising a 3% solution of sodium chloride. The test was also effected with regular vital gluten.

Results

Ten g of sample were added to 300 g of simulated brew medium.

The regular vital gluten rapidly agglomerated and formed an intractable rubbery ball. On the other hand, the modified gluten product according to the present invention very easily and rapidly dispersed to form a fine homogeneous dispersion which, even after several hours, showed no signs of instability: i.e., no tendency to agglomerate could be observed.

EXAMPLE 2

USE OF NOVEL GLUTEN PRODUCT IN BAKING PROCESS

A product according to the present invention produced according to the procedure of Example 1, was dried and used in the production of bread by a standard break making procedure involving incorporating the product into bread flour and baking effected at 400° F. for 40 minutes (Sample C). For comparison purposes, the same procedure was carried out using regular flour ("control"); regular vital gluten (Sample A), and regular vital gluten which had been treated only with sodium citrate (about 2.5% by weight of the gluten)—(Sample B). In each instance 2% by weight, based on the same flour, of the gluten product was used. The bread produced was evaluated for specific volume (by standard rape seed test), crumb tenderness and, generally, for crumb structure.

| Sample | Results Specific Loaf Volume | % Increase |
|---|---|---|
| Control | 8.7 | — |
| A | 9.6 | +9 |
| B | 9.8 | +11 |
| C | 10.1 | +15 |

It can be seen that use of the product of the present invention gives a significant increase in specific volume compared with those obtained using flour alone; regular vital gluten; or even the improved gluten—(Sample B). (This product is described and claimed in our copending application Ser. No. 679,077, now U.S. Pat. No. 4,076,845.)

Figure 3A:
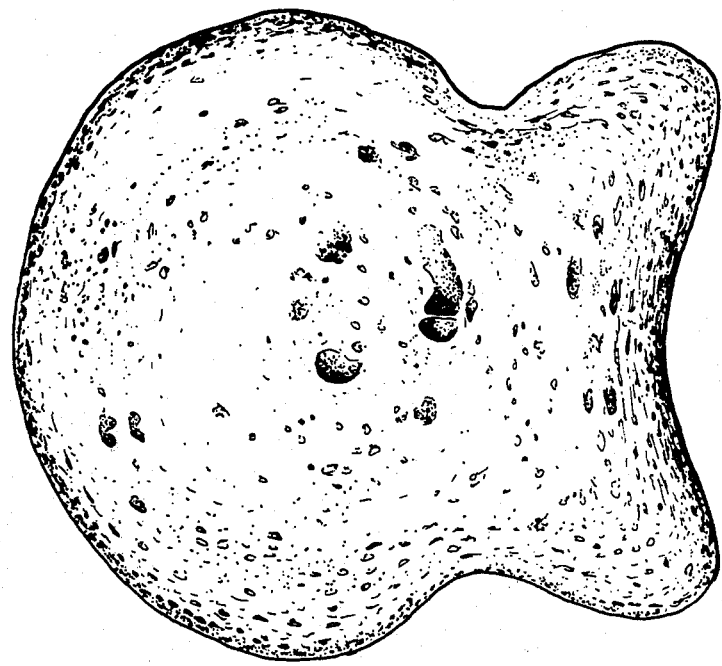

The crumb structure of the product produced using Sample A and Sample C is shown in FIG. 3a and FIG. 3b, respectively. The superiority of the crumb-structure obtained using Sample C, the product of the present invention is self-evident.

EXAMPLE 3

Part A

Vital gluten was prepared as in Example 1 except that it was washed to the extent that it had a total solids content of only 28.9% and an ash content of only 0.21%.

Xanthan gum (KELTROL) and sodium citrate as sequestering agent were added to the wet gluten mass at the same levels (with respect to the gluten solids content) as in Example I—refer to Formula A below.

Part B

The procedure of Part A was repeated with the sole exception that 0.2% of the vital gluten was replaced with 0.2% wheat solubles—refer to formula B below.

| Component | Formula A | Formula B |
|---|---|---|
| Wet Gluten | 93.6 | 93.4 |
| Xanthan | 2.2 | 2.2 |
| Sodium Citrate | 0.4 | 0.4 |
| Wheat Solubles | — | 0.2 |
| Water | 3.8 | 3.8 |
|  | 100.0% | 100.0% |

Each formula was admixed as described in Example 1 and the course of the interaction plotted in graph form as previously. The accompanying FIG. 4 covering the interaction of Formula A and FIG. 5 that of Formula B. Referring to FIG. 4, it can be seen that the reaction mass attained the desired maleable, for example, (extensible) condition after only 8 minutes of mixing (at 250 rpm). However that condition was sustained for only about one minute before conversion to the undesirable rubbery condition commenced.

Referring to FIG. 5, the stable extensible state is achieved in about 11 minutes and lasts about 9 minutes before conversion to the final rubbery state begins.

As noted previously the only difference in the formulae is the presence in Formula B of supplemental wheat solubles and yet the minimum admixing, required and the duration of the mixing "plateau" during which the stable extensible novel product is produced are significantly affected. However, in both instances, the desired modified gluten product having the desired advantageous properties is produced. It will be appreciated therefore that, whilst it is not possible to strictly delineate the mixing time required for each mixture because of the possible variations in the specific constitution of the gluten used, the desired information is easily and rapidly obtained, using one simple test.

Part C

Figure 6:
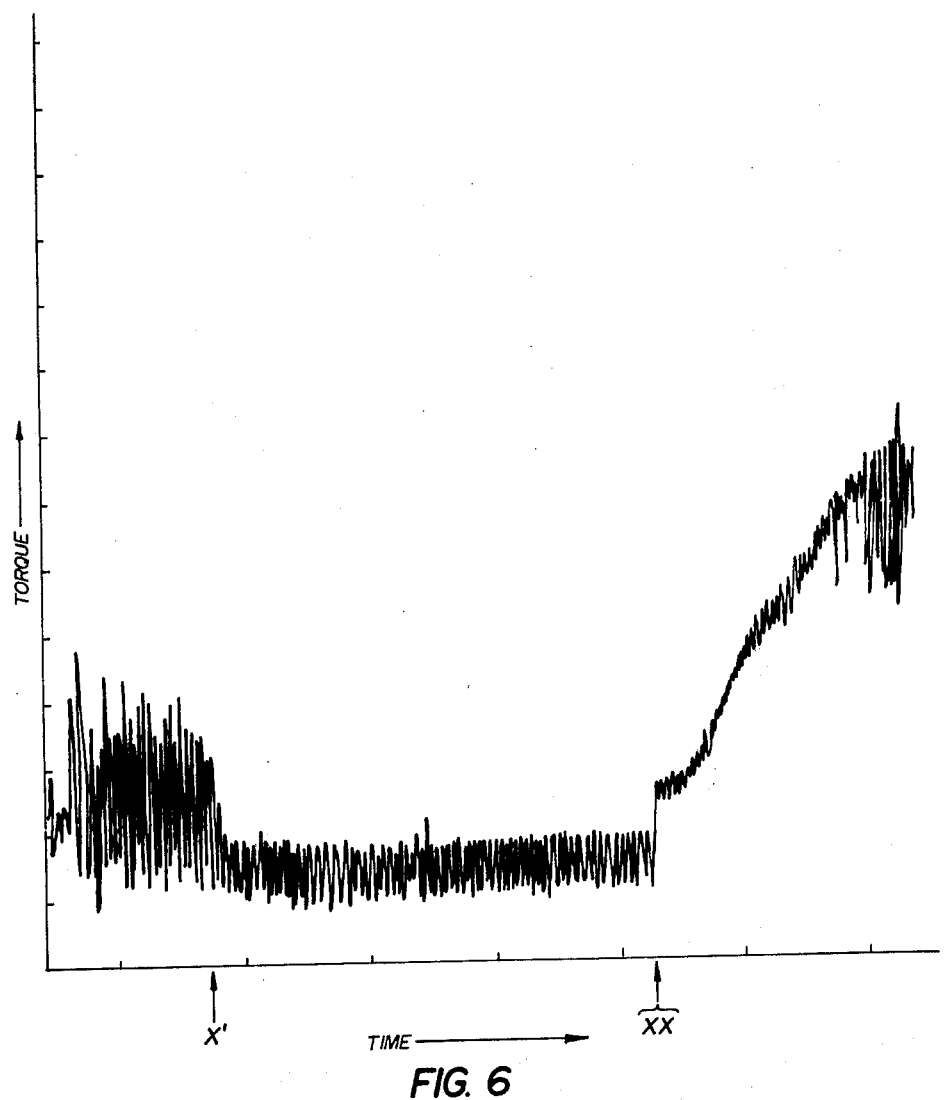

The procedure of Part B was repeated with the sole exception that the mixture was worked for sixteen (16) minutes prior to the addition of the xanthan gum component. The course of the interaction is illustrated in FIG. 6 which, as with previous figures, is a plot of torque v time. The sequestering agent, sodium citrate was added to the wet gluten at point X' whilst the xanthan gum was added sixteen (16) minutes later at point XX. It can be seen that no flat "maleable" state was formed after the addition of the xanthan gum, the onset of production of the final rubbery material commencing virtually immediately upon addition of the xanthan gum.

EXAMPLE 4

Part A

In this experiment, mixing of the vital gluten and xanthan gum was effected with a laboratory scale version of a Model 2JSS Prodex-Henschel mixer. One hundred g of wet gluten (composition as per Example 1) was mixed with 2 g xanthan gum added in aqueous solution at a mixing speed of 6,000 rpm (50 volt input).

Figure 9:
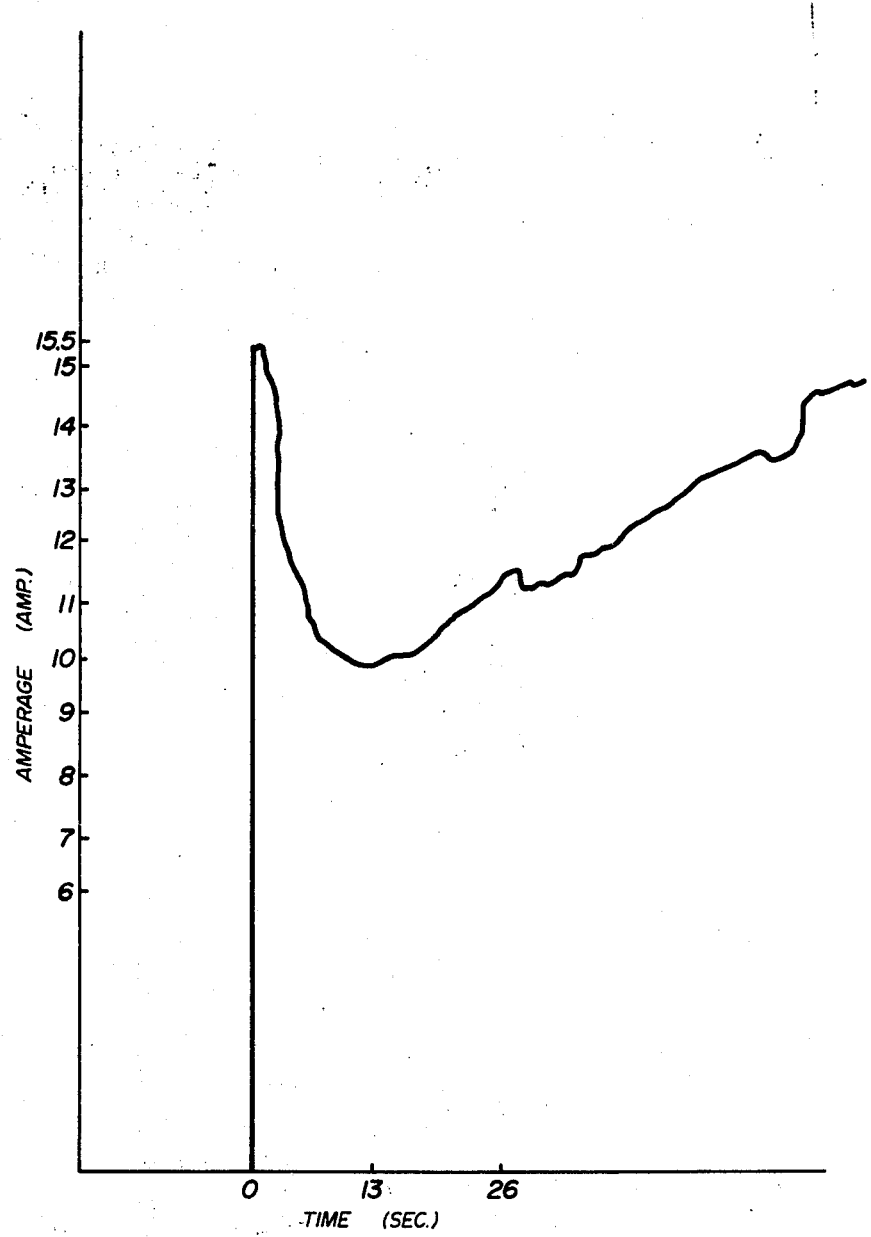
Figure 10A:
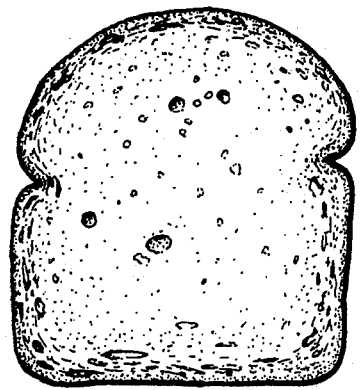
Figure 10B:
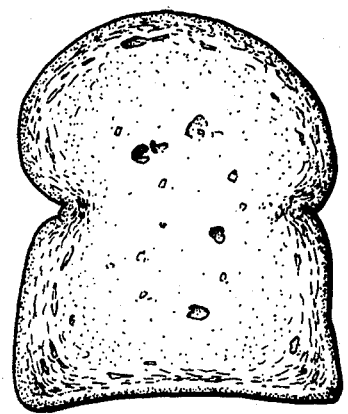
Figure 10C:
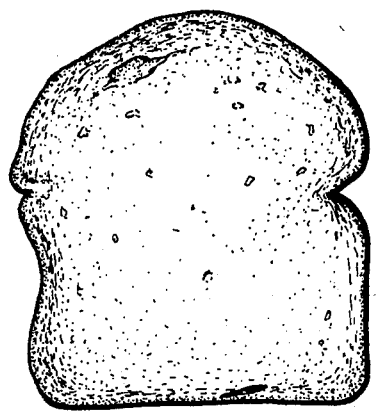
Figure 10D:
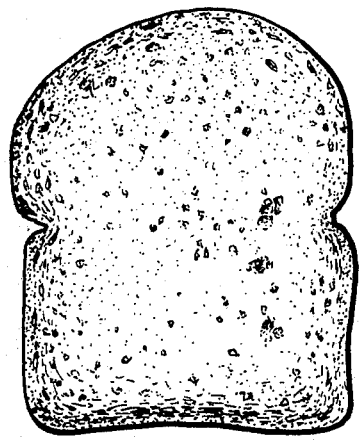

The mixing/reaction was followed by plotting motor amperage against time—refer FIG. 9. The curve obtained is basically similar to FIG. 2 but the various stages are completed in less time. The desired product was formed in about 13 seconds compared with at least about 11 minutes when mixing at lower shear. The total work imput was 7770 watts/sec.

Part B

The modified gluten according to the present invention produced as in Part A (Sample D) was subjected to a similar baking test as described in Example 1. Also as in Example 1, tests were conducted simultaneously on flour alone (Sample A); the same flour with addition of regular wheat gluten (Sample B) and modified gluten according to our copending application Ser. No. 697,077, now U.S. Pat. No. 4,076,845 (Sample C). The loaves produced in the baking test were evaluated for specific volume and crumb. The specific volumes recorded were as follows:

| Sample | Specific Loaf Volume | % Increase |
|---|---|---|
| A | 8.5 | — |
| B | 9.3 | 9.4 |
| C | 9.6 | 12.9 |
| D | 10.1 | 18.8 |

It can be seen that, at the same level of addition the modified gluten product of the present invention gives a significant increase in loaf volume relative to regular vital gluten and even the modified gluten of our copending application Ser. No. 679,077 now U.S. Pat. No. 4,076,845.

Moreover, reference to FIG. 10 show that, whilst the addition of a gluten additive improves the crumb in all cases, the modified gluten of the present invention provides the most even crumb, i.e., the least occurrence of relatively large "craters", etc., as well as giving the largest increase in loaf volume. Samples A, B, C and D are shown in FIGS. 10a, 10b, 10c and 10d, respectively.

Determination of Water Soluble Gliadin

The determination if based on the fact that whereas free gliadin is readily soluble in distilled water, the other gluten water-soluble gluten proteins (mainly albumins and globulins) unlike gliadin, are also soluble in salt solution.

Procedure

A freeze-dried 1 g sample of the novel gluten product of the present invention, such as prepared by the procedure of Example 4, was dispersed in 100 g distilled water; the pH adjusted to 5, and the resulting suspension stirred for one hour. The insoluble material was removed by centrifuging and the residual protein in the supernatant determined, (total soluble protein=T.S.P.) To the supernatant is added 2% sodium chloride which results in the precipitation of the water soluble free gliadin. The precipitate was removed by centrifuging and the protein remaining in solution determined (Salt Soluble Albumins and Globulins=S.S.A.G.). The difference between the two values represents the water soluble gliadin, i.e:

Water Soluble Gliadin (W.S.G.)=T.S.P.−S.S.A.G.

The same procedure was effected on a 1 g control sample of vital gluten which has been subjected to the same mixing process used to prepare the novel modified gluten product of the present invention. In this way, the total amount of water soluble free gliadin was determined.

A sample of the novel product of Example 4 and the vital gluten used in the preparation thereof subjected to the above evaluation gave the following results:

| Results: (As % of total protein) | | | |
| --- | --- | --- | --- |
| | T.S.P. | S.S.A.G. | W.S.G. |
| Control | 49.5 | 6.2 | 43.2 |
| Product of Invention (per Example 3) | 20.6 | 5.9 | 14.7 |

It can be seen that the water soluble gliadin content of the vital gluten has been greatly reduced, by 66%, and this reduction is attributed to its reacting and being complexed with the added xanthan gum and therefore becoming unextractable using the above method.

Degree of Complex Formation Between Gliadin and Xanthan Gum

Procedure (a) A purified gliadin fraction was isolated from regular vital wheat gluten by extraction with 35% isopropylalcohol (refer MacDonald, CER, CHEM. (39) 311, 1962). The gliadin fraction obtained was 80-90% soluble in distilled water at pH 5.

Figure 7:
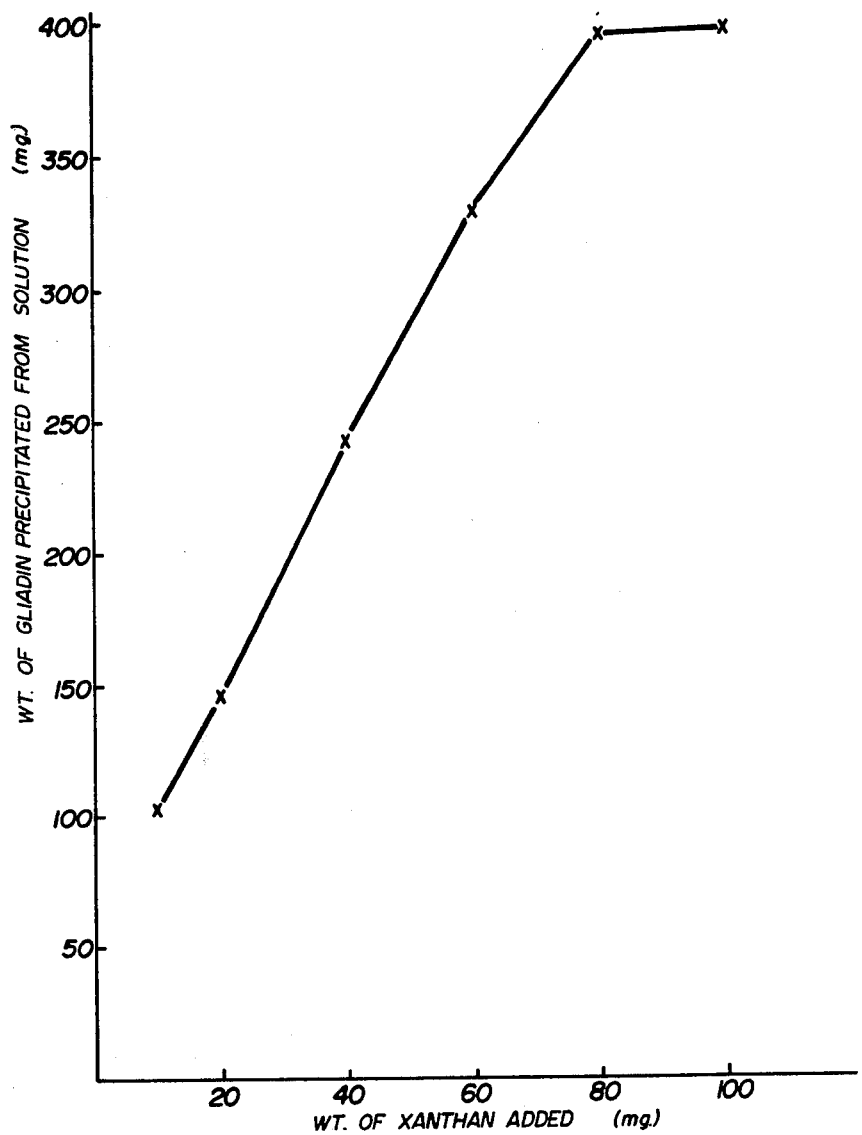

(b) A solution of the gliadin was prepared by dispersing 0.5 g of the gliadin fraction from (a) in 100 ml of distilled water, adjusting the pH to 5, mixing and centrifuging to remove insoluble material. Finally, a solution containing 410 mg of gliadin in 100 ml of distilled water was obtained. In a series of experiments, 20-100 mg aliquots of xanthan gum (as a 0.2% dispersion in distilled water at pH 5) was added to the gliadin solution resulting, in each instance, in the precipitation of a gliadin: xanthan gum complex. The precipitated complex was removed by centrifuging and the gliadin remaining in solution determined. The amount of gliadin in the complex was obtained by difference. The respective amounts of gliadin and xanthan gum are plotted in FIG. 7. As stated previously, it would seem that maximum ratio of gliadin:xanthan gum is about 5:1. Since gliadin generally comprises about 40% of gluten the above data would indicate a corresponding maximum gluten:xanthan gum ratio of about 12.5:1. However, as emphasized previously, washed vital gluten is a natural product which can be variable in composition and therefore also in properties. For this reason, the figure of 12.5:1 cannot be considered as absolute. Further, because of possible undesirable side reactions between the xanthan and gluten components other than free gliadin, it may be necessary and/or desirable to exceed the above ratio of 12.5:1.

Effect of pH on Gliadin:Xanthan Gum Ratio in Complex

Figure 8:
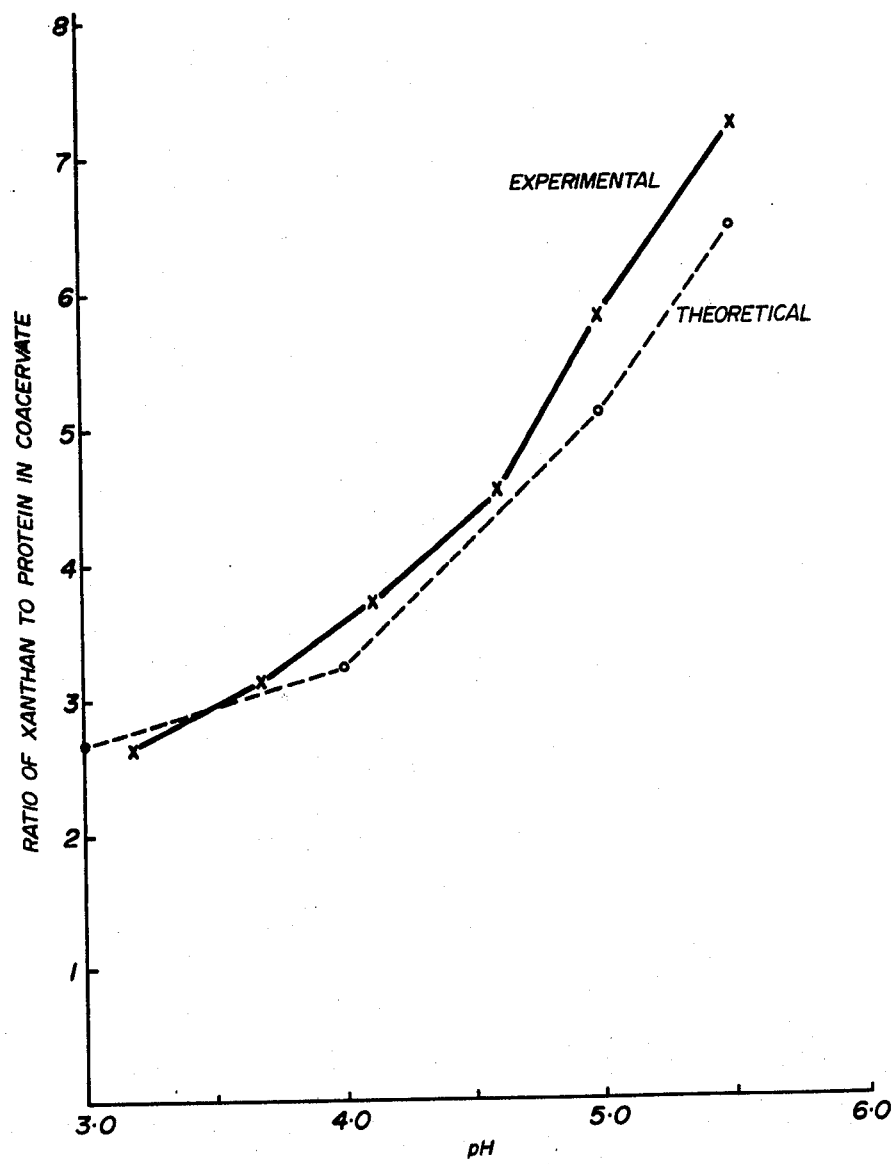

This effect has been referred to previously by reference to FIG. 8.

Method

This was similar to the previous experiment; at each pH, 30 mg of xanthan was added to a solution comprising 410 mg gliadin in 100 ml water. The ratio of gliadin:xanthan gum was calculated by assaying both the gliadin and the xanthan gum remaining in the supernatant following removal of the complex.

We claim:

1. A gluten product consisting essentially of vital gluten modified by reaction with xanthan gum, the ratio of gluten to xanthan gum being from about 200:1 to 4:1 and wherein at least about 40 percent by weight of the free gliadin in the gluten is complexed with the xanthan gum.

2. The product as claimed in claim 1 wherein the ratio of gluten to xanthan gum is from about 60:1 to 20:1.

3. The product as claimed in claim 1 wherein the ratio of gluten to xanthan gum is about 40:1.

4. The product as claimed in claim 1 which also contains a non-toxic buffering and/or sequestering agent.

5. The product as claimed in claim 1 which comprises about 0.25 to 4 percent by weight of the buffering or sequestering agent.

6. Process for the production of gluten product consisting essentially of reacting wet vital gluten having a solids content of at most 40 percent and xanthan gum in a ratio of 200:1 to 4:1 by mixing them together for a period sufficient to achieve a malleable extensible mass to complex said xanthan gum with at least 40 percent weight of the free gliadin in the gluten but insufficient to convert such mass to a rubbery state.

7. The process as claimed in claim 6 wherein the ratio of gluten to xanthan gum is from 60:1 to 20:1 and the solids content of the wet gluten is from 30 to 40 percent.

8. The process as claimed in claim 6 wherein a dough comprising wet vital gluten and xanthan and gum in the stated ratios is mixed at high sheer until a malleable extensible mass is obtained when mixing is arrested to obtain the product in a wet state.

9. The process as claimed in claim 6 wherein the dough includes a non-toxic buffering and/or sequestering agent.

10. The process as claimed in claim 6 wherein the product in a wet state is dried or frozen.

11. In a baking process wherein the dough is fortified by the addition of gluten, the improvement comprising adding to the dough a modified gluten product consisting essentially of vital gluten modified by reaction with xanthan gum, the ratio of gluten to xanthan gum being from 200:1 to 4:1 and wherein at least 40 percent by weight of the free gliadin in the gluten is complexed with the xanthan gum.

* * * * *